United States Patent
Hosaka (10) Patent No.: US 6,664,209 B1
(45) Date of Patent: Dec. 16, 2003

(54) SOLID CATALYST COMPONENT FOR PROPYLENE POLYMERIZATION AND CATALYST

(75) Inventor: Motoki Hosaka, Chigasaki (JP)

(73) Assignee: Toho Titanium Co., Ltd., Chigasaki (JP)

( * ) Notice: Subject to any disclaimer, the term of this patent is extended or adjusted under 35 U.S.C. 154(b) by 0 days.

(21) Appl. No.: 09/623,153

(22) PCT Filed: Dec. 20, 1999

(86) PCT No.: PCT/JP99/07151

§ 371 (c)(1),
(2), (4) Date: Aug. 25, 2000

(87) PCT Pub. No.: WO00/39171

PCT Pub. Date: Jul. 6, 2000

(30) Foreign Application Priority Data

Dec. 25, 1998 (JP) .............................. 10-370178

(51) Int. Cl.[7] .......................... B01J 31/00; B01J 37/00; C08F 4/02; C08F 4/60
(52) U.S. Cl. .................. 502/150; 502/125; 502/126; 502/135; 502/136
(58) Field of Search ................. 502/125, 126, 502/135, 136, 150

(56) References Cited

U.S. PATENT DOCUMENTS 4,654,318 A * 3/1987 Yamamoto et al. ......... 502/119
5,494,872 A    2/1996 Hosaka et al.
5,498,770 A    3/1996 Hosaka et al.
5,684,173 A   11/1997 Hosaka et al.
5,932,510 A    8/1999 Hosaka et al.
5,965,478 A   10/1999 Goto et al.
6,156,690 A *  12/2000 Hosaka ................. 502/118
6,228,793 B1 *  5/2001 Hosaka et al. ........... 502/125

* cited by examiner

*Primary Examiner*—Mark L. Bell
*Assistant Examiner*—Jennine Brown
(74) *Attorney, Agent, or Firm*—Oblon, Spivak, McClelland, Maier & Neustadt, P.C.

(57) ABSTRACT

The present invention provides catalyst for polymerization of a propylene prepared from by using a solid catalyst component for polymerization of a propylene which is prepared by subjecting a dialkoxymagnesium (a), a tatravalent halogen-containing titanium compound (b), and a diester of maleic acid (c) each having a straight-chain or branched chain alkyl group having a carbon number of 2 to 8 into contact with one another by suspending the foregoing components in an aromatic hydrocarbon which melting point is 50 to 150° C. (d), an organic aluminum compound represented by the general formula: $R^1_p AlQ_{3-p}$, and an organic silicon compound represented by the general formula $R^2_q Si(OR^3)_{4-q}$. By using the catalyst for a polymerization of a propylene, an excellent hydrogen response can be shown and a polymer having a high stereoregularity can be obtained in a high yield.

14 Claims, 1 Drawing Sheet

(A) transition metal component $Ti(OR^6)_nX_{4-n}$ $0 \leq n \leq 3$ dialkoxymagnesium diester of maleic acid each
having an alkyl group having
a carbon number of 2 to 8 contact propylene (B) organic metal component $R^1{}_p Al Q_{3-p}$ $0 < p \leq 3$ $R^2{}_q Si(OR^3)_{4-q}$ $0 \leq q \leq 3$

SOLID CATALYST COMPONENT FOR PROPYLENE POLYMERIZATION AND CATALYST

TECHNICAL FIELD

The present invention relates to a solid catalyst component and catalyst for polymerization of a propylene, which shows a high activity and an excellent hydrogen response, and further, can provide a polymer having a high stereoregularity in a high yield.

TECHNICAL BACKGROUND

A solid catalyst component containing magnesium, titanium, an electron donor compound and halogen as essential components has been known as a catalyst component for polymerization of a propylene. Many proposals have been made and known for a process for the polymerization or the copolymerization of a propylene in the presence of a catalyst for polymerization of a propylene comprising said solid catalyst component, an organic aluminum compound and an organic silicon compound. For example, JP-A-57-63310 and JP-A-57-63311 (The term "JP-A as used herein means an "unexamined published Japanese patent application") propose processes for polymerizing an olefin having a carbon number of more than 3 by using a catalyst system comprising a solid catalyst component containing a magnesium compound, a titanium compound and an electron donor compound, an organic aluminum compound and an organic silicon compound having Si—O—C bond. However, these processes are not always satisfactory for obtaining highly stereoregular polymers in a high yield, and further improvement has been demanded.

On the other hand, JP-A-63-3010 discloses a catalyst system for the polymerization of a propylene and a process for polymerizing a propylene using the same, the catalyst system comprising a solid catalyst component prepared by bringing a dialkoxymagnesium, a diester of an aromatic carboxylic acid, an aromatic hydrocarbon and a titanium halide into contact and subjecting the resulting product in a powdered state to a heat treatment, an organic aluminum compound and an organic silicon compound.

JA-A-1-315406 discloses a catalyst system for polymerizing a propylene comprising a solid catalyst component prepared by bringing a titanium tetrachloride into contact with a suspension formed by a diethoxymagnesium with an alkylbenzene, adding phthalic dichloride thereto to react to obtain a solid product, and further contacting the resulting solid product with a titanium tetrachloride in the presence of an alkylbenzene, an organic aluminum compound and an organic silicon compound, and a process for polymerizing a propylene in the presence of said catalyst system.

The foregoing known techniques focus on the development of a catalyst component having a high activity enough to allow the omission of a so-called deashing step, i.e., step of removing catalyst residues such as chlorine and titanium remaining in the polymer produced as well as on the enhancement of the yield of stereoregular polymer or an improvement in durability of the catalyst activity for polymerization, and achieved excellent results to these purposes.

The propylene polymer obtaining by using the foregoing catalysts is utilized in various uses, e.g., a container or a film other than a molded product of an automobile or household appliances. When products are molded with many kinds of molding machines from a fused polymer powder produced by polymerization, especially when large molded products are manufactured by the method such as an injection molding, etc. a high melt flow rate of the fused polymer is demanded. Therefore, many researches have been conducted to advance a melt flow rate of a polymer.

A melt flow rate of a polymer is very dependent on a molecular weight of the polymer. In manufactory industries, hydrogen is generally added as a regulator of a molecular weight of a polymer produced in the polymerization of a propylene. In order to produce a polymer having a low molecular weight, i.e, in order to produce a polymer having a high melt flow rate, a lot of hydrogen is usually added, but a quantity of hydrogen can be added is limited because a pressure-resistance of a reactor is limited for safety. Therefore a partial pressure of a monomer should be reduced in this case, so that a productivity of a polymer should be declined. Also a problem of a cost arises from using a large quantity of hydrogen. So the development of a catalyst system which shows a high hydrogen response, which can provide a polymer having a high stereoregularity in a high yield, and which can produce a polymer having a high melt flow rate even when a quantity of hydrogen used in polymerization is little is demanded, but the foregoing known techniques have been not enough to resolve the problems.

Furthermore, because compounds each having a benzene ring have been mainly used as an electron donor compounds in foregoing known techniques, the present inventors have evaluated compounds each having no benzene ring as electron donor compounds in view of the environmental issue. Therefore, the present inventors have found that some kinds of derivatives of maleic acid show an excellent effect and reached to the completion of the present invention.

As a result of extensive investigations to solve the foregoing problems remaining in the prior art techniques, the present inventors have found that to use a diester of maleic acid each having a straight-chain or branched chain alkyl groups having a carbon number of 2 to 8 among all kinds of a diester of maleic acid as a principal component of an electron donor, and particularly to use at least one species of a diester of maleic acid each having a straight-chain alkyl groups having a carbon number of 2 to 5 as a principal component of the diester of maleic acid are very effective to solve the problems. Therefore the present inventors have reached to the completion of the present invention.

Namely, an objective of the present invention is to solve the problems remaining in the prior art techniques and to provide a solid catalyst component and a catalyst for polymerization of a propylene, which shows a higher hydrogen response and a higher activity than that of a conventional catalyst, can provide a polymer having a high stereoregularity and a high bulk density in a high yield, and contains no aromatic esters as constituent components.

DISCLOSURE OF THE INVENTION

To solve the objective of the present invention, a solid catalyst component for polymerization of a propylene of the present invention is prepared by bringing a dialkoxymagnesium (a), a tetravalent halogen-containing titanium compound (b), and a diester of maleic acid each having a straight-chain or branched-chain alkyl group having a carbon number of 2 to 8 (c) into contact with one another. In the procedure a diester of maleic acid each having straight-chain alkyl group having a carbon number of 2 to 5 may be used preferably as a principal component of the component (c). Furthermore, the solid catalyst component for polymerization of a propylene of the present invention may be prepared preferably by contacting the foregoing components with one another in a suspended state in an aromatic hydrocarbon (d) which boiling point is from 50 to 150° C.

Further a catalyst system for polymerization of a propylene of the present invention comprises:

(A) the foregoing solid catalyst component, (B) an organoaluminium compound represented by the general formula (1):

$$R^1_p AlQ_{3-p} \quad (1)$$

wherein $R^1$ represents an alkyl group having a carbon number of 1 to 4, Q represents a hydrogen atom or halogen atom; and p represents a real number of from more than 0 to not more than 3; and (C) an organic silicon compound represented by the general formula (2)

$$R^2_q Si(OR^3)_{4-q} \quad (2)$$

wherein $R^2$ represents an alkyl group having a carbon number of 1 to 12, cycloalkyl, phenyl, vinyl, allyl or aralkyl group which may be the same or different; $R^3$ represents an alkyl group having a carbon number of 1 to 4, cycloalkyl, phenyl, vinyl, allyl or aralkyl group which may be the same or different; and q represents 0 or an integer of from 1 to 3.

BEST EMBODIMENT FOR IMPLEMENTING THE INVENTION

Figure 1:
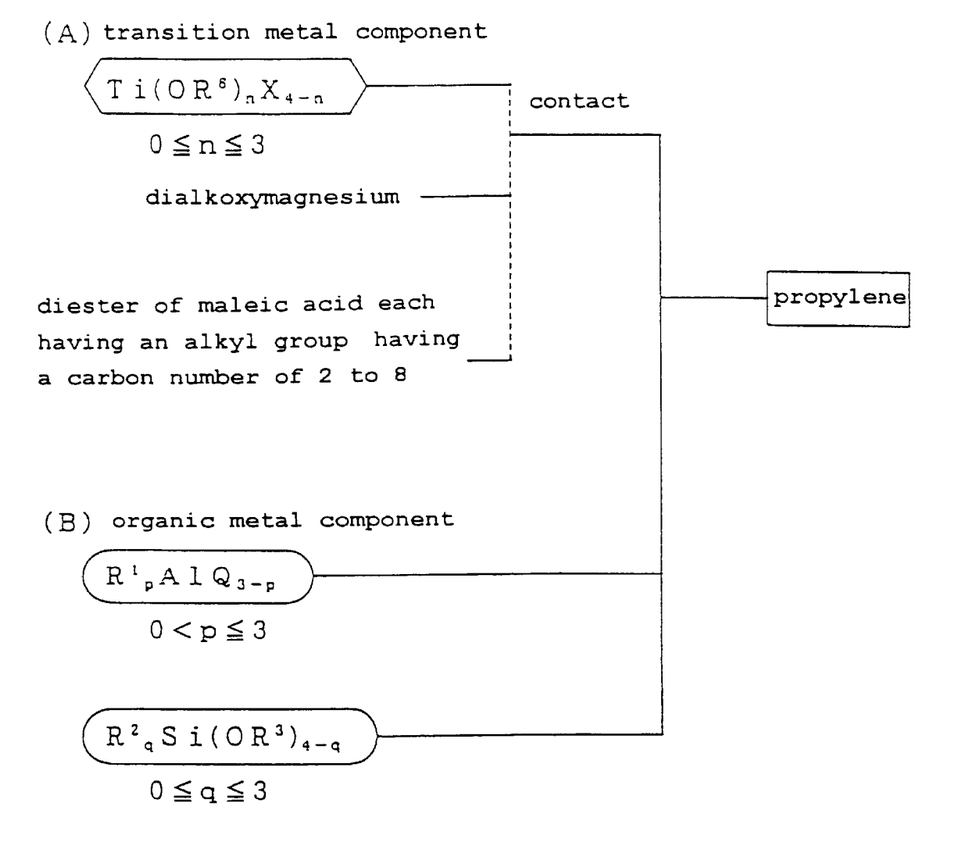
FIG. 1 is a flow chart of a process for preparing a solid catalyst component and a polymerizing catalyst of the present invention.

Preferred examples of the dialkoxymagnesium (a) (hereinafter occasionally referred to as "component (a)") used for preparing the solid catalyst component for polymerization of a propylene (A) of the present invention (hereinafter occasionally referred to as "solid catalyst component (A)") include the compounds represented by the general formula: Mg(OR$^4$) (OR$^5$) (in the formula R$^4$and R5 each represent alkyl group having a carbon number of 1 to 10, which may be the same or different). Specific examples of the dialkoxymagnesium (a) include dimethoxymagnesium, diethoxymagnesium, dipropoxymagnesium, dibutoxymagnesium, ethoxymethoxymagnesium, ethoxypropoxymagnesium, and butoxyethoxymagnesium, etc. These dialkoxymagnesiums may be obtained by reacting a magnesium metal with an alcohol in the presence of a halogen or a halogenated metal compound. Further the foregoing dialkoxymagnesium compounds may be used singly or in combination of two or more species of them.

The dialkoxymagnesium may be used in granular or powder form to prepare the solid catalyst component (A) of the present invention. The particle shape of the dialkoxymagnesium may be amorphous or spherical. If a spherical particulate dialkoxymagnesium is used, a polymer powder having a better particle shape and a narrower particle size distribution can be obtained. Thus, the polymer powder produced can be easily handled during the polymerization, eliminating troubles such as blocking caused by the fine powder contained in the polymer powder produced.

The foregoing spherical particulate dialkoxymagnesium does not necessarily need to be truly spherical but may be ellipsoidal or pebble-like. In some detail, the sphericity of the particle is normally not more than 3, preferably from 1 to 2, more preferably from 1 to 1.5 as calculated in terms of the ratio of major axis length l to minor axis length w (l/W).

Furthermore, the foregoing dialkoxymagnesium may have an average particle diameter of normally from 1 to 200 μm, preferably from 5 to 150 μm. The foregoing spherical particulate dialkoxymagnesium has an average particle diameter of normally from 1 to 100 μm, preferably from 5 to 50 μm, more preferably from 10 to 40 μm. Further, referring to its particle size, the foregoing spherical particulate compound preferably has a narrow particle size distribution comprising less fine or coarse powder. In some detail, the particle size distribution comprises particles having a particle size of not more than 5 μm in an amount of not more than 20%, preferably not more than 10%, and particles having a particle size of at least 100 μm in an a mount of not more than 10%, more preferably not more than 5%. The particle size distribution is not more than 3, preferably not more than 2 as calculated in terms of ln ($D_{90}/D_{10}$) wherein $D_{90}$ represents the particle diameter at the point where the accumulated particle size reaches 90% and $D_{10}$ represents the particle diameter at the point where the accumulated particle size reaches 10%.

The process for preparing such foregoing spherical particulate dialkoxymagnesium is disclosed in JP-A-58-41832, JP-A-62-51633, JP-A-3-74341, JP-A-4-368391, and JP-A-8-73388.

Examples of the tatravalent halogen-containing titanium compound (b) to be used in the preparation of the solid catalyst component (A) of the present invention is one or more of titanium halides and alkoxytitanium halides each represented by the general formula: Ti (OR$^6$)$_n$X$_{4-n}$ wherein $R^6$ represents an alkyl group having a carbon number of 1 to 4; X represents a halogen atom such as chlorine, bromine and iodine; and n represents 0 or a n integer of from 1 to 4.

Specific examples of such titanium compounds include titanium tetrahalides such as titanium tetrachloride, titanium tetrabromide and titanium tetraiodide, an alkoxytitanium halide such as methoxytitanium trichloride, ethoxytitanium trichloride, propoxytitanium trichloride, n-butoxytitanium trichloride, demethoxytitanium dichloride, diethoxytitanium dichloride, dipropoxytitanium dichloride, di-n-butoxytitanium dichloride, trimethoxytitanium chloride, triethoxytitanium chloride, tripropoxytitanium chloride, and tri-n-butoxytitanium chloride. Preferred among these titanium compounds is titanium tetrahalide. Particularly preferred is titanium tetrachloride. These titanium compounds may be used singly or in combination of two or more of them.

The diester of maleic acid each having a straight-chain or branched chain alkyl group having a carbon number of 2 to 8 (c) to be used for the preparation of the solid catalyst component (A) of the present invention, is represented by the following general formula (3):

wherein $R^7$ and $R^8$ may be the same or different, each represent a straight-chain or branched chain alkyl group having a carbon number of 2 to 8.

Examples of the diester of maleic acid (c) include diethyl maleate, di-n-propyl maleate, di-iso-propyl maleate, di-n-butyl maleate, di-iso-butyl maleate, di-n-pentyl maleate, di-iso-pentyl maleate, di-n-hexyl maleate, di-iso-hexyl maleate, di-n-heptyl maleate, di-iso-heptyl maleate, di-n-octyl maleate, and di-2-ethlyhexyl maleate and etc. The diester of maleic acid represented by the general formula (3) may be used singly or in combination of two or more of them. Among these foregoing diester of maleic acid, the diester of maleic acid each having a straight-chain alkyl group having a carbon number of 2 to 5 may be used as a principal component preferably in the present invention. Specific examples of the diester of maleic acid each having a straight-chain alkyl group having a carbon number of 2 to 5 include diethyl maleate, di-n-propyl maleate, di-n-butyl maleate, and di-n-pentyl maleate.

As is shown in the foregoing description, to use the diester of maleic acid having a straight-chain or branched chain alkyl group having a carbon number of 2 to 8 is an indispensable requirement in the present invention. Preferably, the diester of maleic acid each having a straight-chain alkyl group having a carbon number of 2 to 5 carbon atoms may be used. By using the foregoing diester of maleic acid, a solid catalyst component for polymerization of a propylene which has a good balance between an activity, a stereoregularity, and a bulk density, and shows a higher hydrogen response than that of the foregoing catalyst component prepared by using an electron donor compound such as a phthalic diester can be obtained. If a diester of maleic acid each having an alkyl group having a carbon number of less than 2 is used in the present invention, an activity shown by a solid catalyst component formed with the diester of maleic acid should be extremely low, and to the contrary, if a diester of maleic acid each having an alkyl group having a carbon number more than 8 is used, a stereoregularity of a polymer produced declines. Furthermore, by using the diester of maleic acid each having a straight-chain alkyl group having a carbon number of 2 to 5 among the foregoing diester of maleic acid each having a straight-chain or branched chain alkyl group having a carbon number of 2 to 8 as a principal component of the diester of maleic acid, a solid catalyst component for polymerization of a propylene having a better balance between an activity, a stereoregularity, and a bulk density can be obtained. Wherein 'using the diester of maleic acid having a straight-chain alkyl group having a carbon number of 2 to 5 as a principal component' represents that a content of the diester of maleic acid each having a straight-chain alkyl group having a carbon number of 2 to 5 is at least 50 wt. % of a total amount of the diester of maleic acid used. Furthermore, at least one species of the diester of maleic acid (c) is a combination of at least one species selected from the diester of maleic acid each having a straight-chain alkyl group having a carbon number of 2 to 5 and the diester of maleic acid each having a straight-chain or branched chain alkyl group having a carbon number of 2 to 8, and a content of the diester of maleic acid each having a straight-chain alkyl group having a carbon number of 2 to 5 may be at least 50 wt. % of a total amount of the diester of maleic acid used.

Furthermore, the diester of maleic acid (c) may be a di-n-butyl maleate most preferably in view of a total performance comprising an activity, a stereoregularity, a bulk density, and a hydrogen response. Preferably, a content of the di-n-butyl maleate may be at least 50 wt. % of a total amount of the diester of maleic acid used. If the di-n-butyl maleate is used with at least one species selected from the diester of maleic acid each having a straight-chain or branched chain alkyl group having a carbon number of 2 to 8 and a content of the di-n-butyl maleate is at least 50 wt. % of a total amount of the diester of maleic acid used, it is made possible to control a stereoregularity of a polymer produced.

In the present invention, the solid catalyst component (A) may be prepared by contacting the component (a), the component (b), and the component (c) in a suspended state in the aromatic hydrocarbon(d) which boiling point is from 50 to 150° C. to show the foregoing performance preferably. The preferred examples of the aromatic hydrocarbon are toluene, xylene, and ethylbenzene. These compounds may be used singly or in conbination of two or more species of them.

In the preparation process of the solid catalyst component (A) of the present invention an aluminum compound, a metal salt of an organic acid or a polysiloxane may be used other than the foregoing components (a), (b), (c), and (d). To use these compounds is effective to control a crystallinity of a polymer produced.

Specific examples of the aluminum compound are aluminum trichloride, diethoxy aluminum chloride, di-iso-propoxy aluminum chloride, ethoxy aluminum dichloride, iso-propoxy aluminum dichloride, butoxy aluminum dichloride, triethoxy aluminum.

Specific examples of the metal salt of an organic acid are sodium stearate, magnesium stearate and aluminum stearate.

As the polysiloxanes there may be used one or more compounds represented by the following general formula:

In the foregoing general formula, α represents an average polymerization degree of from 2 to 30,000. Most of $R^9$ to $R^{16}$ each represent a methyl group. A phenyl group, hydrogen atom, higher fatty acid residue having a carbon number of 10 to 20, epoxy-containing group or polyoxyalkylene group having a carbon number of 1 to 10 may substitute some of $R^9$ to $R^{16}$. The compound represented by the foregoing general formula may form a cyclic polysiloxane in which $R^{12}$ and $R^{13}$ each are methyl group.

The polysiloxane is known generically as silicone oil. It is a chain, partial hydrogenated, cyclic or denatured polysiloxane having a viscosity of from 2 to 10,000 cSt, preferably from 3 to 500 cSt, at 25° C. which stays liquid or viscous at a room temperature.

Specific examples of the polysiloxane are dimethyl polysiloxane and methyl phenyl polysiloxane as a chain polysiloxane, methyl hydrogen polysiloxane of which the rate of hydrogenation is 10 to 80% as a partial hydrogenated polysiloxane, hexamethylcyclotrisiloxane, octamethylcyclotetrasiloxane, decamethylcyclopentasiloxane, 2,4,6-trimethylcyclotrisiloxane, and 2,4,6,8-tetramethyl-cyclotetrasiloxane as a cyclic polysiloxane and higher fatty acid-substituted dimethylsiloxane, epoxy-substituted dimethylsiloxane, and polyoxyalkylene-substituted dimethylsiloxane as a denatured polysiloxane.

Typical method for contacting foregoing components is described below.

The solid catalyst component (A) of the present invention can be prepared by bringing the dialkoxymagnesium (a), the tetravalent halogen-containing titanium compound (b), the diester of maleic acid each having a straight-chain or branched chain alkyl group having a carbon number of 2 to 8 (c), the aromatic hydrocarbon (d), and further at liberty, an aluminum compound, a metal salt of organic acid and/or a polysiloxane into contact with one another.

More concrete method will be given below.

A dialkoxymagnesium (a) is suspended in a tetravalent halogen-containing titanium compound (b) or an aromatic hydrocarbon (d), and the product is further contacted with a diester of maleic acid each having a straight-chain or branched chain alkyl group having a carbon number of 2 to 8 (c) and/or a tetravalent halogen-containing titanium compound (b) to obtain a solid component. In the method, by using a spherical magnesium compound, the solid catalyst component having a spherical particle and a narrow particle size distribution can be obtained. Moreover, the solid component having a spherical particle and a narrow particle size distribution can be also obtained, for example, by forming a particle by so called a "spray-drying method" in which a solution or a suspension is sprayed and dried by using a spraying apparatus.

The contact for each component is conducted under an atmosphere of an inert gas and a condition of eliminating water, etc. with stirring in a vessel with an agitator. The temperature for contacting can be set up at relatively low temperature range of around a room temperature in the case of simply mixing with stirring after contacting or conducting a denatured treatment by dispersing or suspending. However, in the case of obtaining a product by reacting after contacting, the temperature for contacting is preferably at the temperature range from 40 to 130° C. If the temperature of the reaction is less than 40° C., such reaction is not proceeded completely and an efficiency of the resulting solid component becomes insufficient. If the temperature of the reaction exceeds 130° C., the reaction is hard to control because the solvent used in reaction vaporizes extremely. The time for reaction is usually 1 minute or more, preferably 10 minutes or more, more preferably, 30 minutes or more.

Typical contacting orders of the foregoing components for preparing the solid catalyst component (A) of the present invention is described more concretely below.

(1) (a)→(d)→(b)→(c)→<<interim washing→(d)→(b)>>→last washing→solid catalyst component(A)

(2) (a)→(d)→(c)→(b)→<<interim washing→(d)→(b)>>→last washing→solid catalyst component(A)

(3) (a)→(d)→(b)→(c)→<<interim washing→(d)→(b)→(c)→>>last washing→solid catalyst component(A)

(4) (a)→(d)→(b)→(c)→<<interim washing→(d)→(c)→(b)>>→last washing→solid catalyst component(A)

(5) (a)→(d)→(c)→(b)→<<interim washing→(d)→(b)→(c)>>→last washing→solid catalyst component(A)

(6) (a)→(d)→(c)→(b)→<<interim washing→(d)→(c)→(b)>>→last washing→solid catalyst component(A)

In the each contacting method, if necessary, the process written in double bracket (<< >>) may be repeated plural times to improve an activity. Furthermore the component (b) and component (d) used in the process in << >>, may be newly added and residue in the preceding process. In any step of the foregoing contacting method, if necessary, an aluminum compound, a metal salt of an organic acid, and (/or) a polysiloxane may be contacted. Furthermore in any step other than the washing steps as are shown in the foregoing (1) to (6), the product obtained in any step of contacting methods may be washed with hydrocarbon compounds which states liquid at a room temperature.

Based on the above-description, preferred example of the method for the preparation of the solid catalyst component (A) used in the present invention will be given below.

A dialkoxymagnesium (a) is suspended in an aromatic hydrocarbon (d) which boiling point is from 50 to 150° C. to make a suspension, and then contacting a tetravalent halogen-containing titanium compound (b) with the suspension, and then carrying out a reaction process, wherein before and after the tetravalent halogen-containing titanium compound (b) is contacted with the suspension, one or more species of a diester of maleic acid (c) each having a straight-chain or branched chain alkyl group having a carbon number of 2 to 8 (c) is contacted with the suspension at −20 to 130° C. to obtain a solid reaction product (1). In the procedure, before and after the one or more species of the diester of maleic acid (c) is contacted, an aging reaction at a low temperature may be conducted preferably. After the washing (interim washing) of the solid reaction product (1) with an aromatic hydrocarbon which states liquid at room temperature, a tetravalent hydrogen-containing titanium compound (b) is further contacted at −20 to 100° C. in the presence of an aromatic hydrocarbon compound, and is subjected to a reaction treatment to obtain a solid reaction compound (2). In the procedure, before or after the tetravalent halogen-containing titanium compound (b) is contacted with the solid reaction compound (1), one or more species of a diester of maleic acid each having a straight-chain or branched chain alkyl group having a carbon number of 2 to 8 (c) may be contacted preferably. Then, if necessary, an interim washing and a reaction treatment are repeated plural times. The solid reaction product (2) is washed (last washing) with a hydrocarbon which states liquid at a room temperature to obtain a solid catalyst component (A).

The preferable conditions of the foregoing treatments and washings will be given below:

① The aging reaction at a low temperature: normally −20 to 70° C., preferably −10 to 60° C., more preferably 0 to 30° C., normally one minute to six hours, preferably 5 minutes to 4 hours, more preferably 10 minutes to 3 hours.

② The reaction treatment: normally 0 to 130° C., preferably 40 to 120° C., more preferably 50 to 115° C., normally 0.5 hour to 6 hours, preferably 0.5 hour to 5 hours, more preferably 1 hour to 4 hours.

③ The washing: normally 0 to 110° C., preferably 30 to 100° C., more preferably 30 to 90° C., normally repeated one time to twenty times, preferably repeated one time to fifteen times, repeated more preferably one time to ten times.

An aromatic hydrocarbon and a saturated hydrocarbon which state liquid at a room temperature may be used preferably in the washing, and the examples of the aromatic hydrocarbon include toluene, xylene, and ethlybenzene, and the examples of the saturated hydrocarbon include hexane, heptane, and cyclohexane. Preferably, aromatic hydrocarbon may be used in the interim washing and suturated hydrocarbon may be used in the last washing.

In the process of the preparing the solid catalyst component (A), the proportion of an amount of each component used is not specifically limited because it is differed depending on the preparation method. Specific examples of the proportion of a tetravalent halogen-containing titanium compound is from 0.5 to 100 mols, preferably 0.5 to 50 mols, more preferably 1 to 10 mols per one mol of a dialkoxymagnesium. The proportion of a diester of maleic acid is from 0.01 to 10 mols, preferably 0.01 to 1 mol, more preferably 0.02 to 0.6 mol per one mol of a dialkoxymagnesium. The proportion of an aromatic hydrocarbon is 0.001 to 500 mols, preferably 0.001 to 100 mols, more preferably 0.005 to 10 mols per one mol of a dialkoxymagnesium.

Although contents of titanium, magnesium, a halogen atom, a diester of maleic acid in the solid catalyst component (A) is not specifically limited, a content of titanium is normally 1.8 to 8.0 wt. %, preferably 2.0 to 8.0 wt. %, more preferably 3.0 to 8.0 wt. %, a content of magnesium is normally 10 to 70 wt. %, preferably 10 to 50 wt. %, more preferably 15 to 40 wt. %, most preferably 15 to 25 wt. %, a content of a halogen atom is normally 20 to 90 wt. %, preferably 30 to 85 wt. %, more preferably 40 to 80 wt. %, most preferably 45 to 75 wt. %, a total content of a diester of maleic acid is normally 0.5 to 30 wt. %, preferably 1 to 25 wt. %, more preferably 2 to 20 wt. %. To show a better balance of a total performance of a solid catalyst component (A) in the present invention comprises the diester of maleic acid and the other components, a content of titanium is preferably 3 to 8 wt. %, a content of magnesium is preferably 15 to 25 wt. %, a content of a halogen atom is preferably 45 to 75 wt. %, a content of a diester of maleic acid is 2 to 20 wt. %.

As the organic aluminum compound (B) to be used to form the catalyst for polymerization of a propylene of the present invention, there may be used a compound represented by the general formula: $R^1_q AlQ_{3-p}$ (in which $R^1$ represents an alkyl group having a carbon number of 1 to 4; Q represents a hydrogen atom or halogen atom; and p represents a real number of more than 0 to not more than 3). Specific examples of the organic aluminum compound (B) include triethylaluminum, diethylaluminum chloride, tri-iso-butylaluminum, diethylaluminum bromide, and diethylaluminum hydride. These organic aluminum compounds may be used singly or in combination of two or more of them. Preferred among these organic aluminum compounds are triethylaluminum, and tri-iso-butylaluminum.

As the organic silicon compound (C) to be used in the present invention there may be used a compound represented by the general formula: $R^2_q Si(OR^3)_{4-q}$ (in which $R^2$ may be the same or different and represents an alkyl group having a carbon number of 1 to 12, cycloalkyl, phenyl, vinyl, allyl or aralkyl group; $R^3$ may be the same or different and represents an alkyl group having a carbon number of 1 to 4, cycloalkyl, phenyl, vinyl, allyl or aralkyl group; and q represents 0 or an integer of from 1 to 3). Specific examples of the organic silicon compound (C) include phenylalkoxysilane, alkylalkoxysilane, phenylalkylalkoxysilane, cycloalkylalkoxysilane and cycloalkylalkylalkoxysilane.

Specific examples of the foregoing organic silicon compound include trimethylmethoxysilane, trimethylethoxysilane, tri-n-propylmethoxysilane, tri-n-propylethoxysilane, tri-n-butylmethoxysilane, tri-iso-butylmethoxysilane, tri-t-butylmethoxysilane, tri-n-butylethoxysilane, tricyclohexylmethoxysilane, tricyclohexylethoxysilane, cyclohexyldimethylmethoxysilane, cyclohexyldiethylmethoxysilane, cyclohexyldiethylethoxysilane, dimethyldimethoxysilane, dimethyldiethoxysilane, di-n-propyldimethoxysilane, di-iso-propyldimethoxysilane, di-n-propyldiethoxysilane, di-iso-propyldiethoxysilane, di-n-butyldimethoxysilane, di-iso-butyldimethoxysilane, di-t-butyldimethoxysilane, di-n-butyldiethoxysilane, n-butylmethyldimethoxysilane, bis(2-ethylhexyl)dimethoxysilane, bis(2-ethylhexyl)diethoxysilane, dicyclopentyldimethoxysilane, dicyclopentyldiethoxysilane, dicyclohexyldimethoxysilane, dicyclohexyldiethoxysilane, bis(3-methylcyclohexyl) dimethoxysilane, bis-(4-methylcyclohexyl) dimethoxysilane, bis(3,5-dimethylcyclohexyl) dimethoxysilane, cyclohexylcyclopentyldimethoxysilane, cyclohexylcyclopentyldiethoxysilane, cyclohexylcyclopentyldipropoxysilane, 3-methylcyclohexylcyclopentyldimethoxysilane, 4-methylcyclohexylcyclopentyldimethoxysilane, 3,5-dimethylcyclohexylcyclopentyldimethoxysilane, 3-methylcyclohexylcyclohexyldimethoxysilane, 4-methylcyclohexylcyclohexyldimethoxysilane, 3,5-dimethylcyclohexylcyclohexyldimethoxysilane, cyclopentylmethyldimethoxysilane, cyclopentylmethyldiethoxysilane, cyclopentylethyldiethoxysilane, cyclopentyl(iso-propyl) dimethoxysilane, cyclopentyl(iso-butyl)dimethoxysilane, cyclohexylmethyldimethoxysilane, cyclohexylmethyldiethoxysilane, cyclohexylethyldimethoxysilane, cyclohexylethyldiethoxysilane, cyclohexyl(n-propyl) dimethoxysilane, cyclohexyl(iso-propyl)dimethoxysilane, cyclohexyl(n-propyl)diethoxysilane, cyclohexyl(iso-butyl) dimethoxysilane, cyclohexyl (n-butyl)diethoxysilane, cyclohexyl(n-pentyl)dimethoxysilane, cyclohexyl(n-pentyl) diethoxysilane, diphenyldimethoxysilane, diphenyldiethoxysilane, phenylmethyldimethoxysilane, phenylmethyldiethoxysilane, phenylethyldimethoxysilane, phenylethyldiethoxysilane, methyltrimethoxysilane, methyltriethoxysilane, ethyltrimethoxysilane, ethyltriethoxysilane, n-propyltrimethoxysilane, iso-propyltrimethoxysilane, n-propyltriethoxysilane, iso-propyltriethoxysilane, n-butyltrimethoxysilane, iso-butyltrimethoxysilane, t-butyltrimethoxysilane, n-butyltriethoxysilane, 2-ethylhexyltrimethoxysilane, 2-ethylhexyltriethoxysilane, cyclopentyltrimethoxysilane, cyclopentyltriethoxysilane, cyclohexyltrimethoxysilane, cyclohexyltriethoxysilane, vinyltrimethoxysilane, vinyltriethoxysilane, phenyltrimethoxysilane, phenyltriethoxysilane, tetramethoxysilane, tetraethoxysilane, tetrapropoxysilane and tetrabutoxysilane. Among the foregoing compounds, di-n-propyldimethoxysilane, di-iso-propyldimethoxysilane, di-n-butyldimethoxysilane, di-iso-butyldimethoxysilane, di-t-butyldimethoxysilane, di-n-butyldiethoxysilane, t-butyltrimethoxysilane, dicyclohexyldimethoxysilane, dicyclohexyldiethoxysilane, cyclohexylmethyldimethoxysilane, cyclohexylmethyldiethoxysilane, cyclohexylethyldimethoxysilane, cyclohexylethyldiethoxysilane, dicyclopentyldimethoxysilane, dicyclopentyldiethoxysilane, cyclopentylmethyldimethoxysilane, cyclopentylmethyldiethoxysilane, cyclopentylethyldiethoxysilane, cyclohexylcyclopentyldimethoxysilane, cyclohexylcyclopentyldiethoxysilane, 3-methylcyclohexylcyclopentyldimethoxysilane, 4-methylcyclohexylcyclopentyldimethoxysilane, 3,5-dimethylcyclohexylcyclopentyldimethoxysilane, may be used preferably, and the foregoing organic silicon compound (C) may be used singly or in combination of two or more of them.

In the polymerization process of the present invention, the polymerization of a propylene is accomplished by the polymerization or copolymerization of a propylene in the presence of a catalyst made of the foregoing solid catalyst component (A), organic aluminum compound (B) and organic silicon compound (C) The ratio of the various components to be used is arbitrary and not specifically limited unless the effects of the present invention are impaired. In general, a proportion of the organic aluminum compound (B) is from 1 to 2,000 mols, preferably from 50 to 1000 mols per mol of titanium atom in the solid catalyst component (A). A proportion of the organic aluminum compound (C) is from 0.002 to 10 mols, preferably from 0.01 to 2 mols, more preferably from 0.01 to 0.5 mol per mol of the component (B).

The order of contact of each component is arbitrary. Preferably, organic aluminum compound (B) is charged first into a polymerization system, and then brought into contact with organic silicon compound (C), and further contact with solid catalyst component (A).

The process for polymerization of the present invention may be carried out in the presence or absence of an organic solvent. A propylene monomer to be polymerized may be used in either a gaseous state or a liquid state. The polymerization temperature is not higher than 200° C., preferably not higher than 100° C. The polymerization pressure is not higher than 10 MPa, preferably not higher than 5 MPa. The continuous polymerization process or batchwise polymerization process may be applied. Further, the polymerization reaction may be carried out in one step or two or more steps.

Though the solid catalyst component and the catalyst of the present invention are for the polymerization of a propylene, may be used in the copolymerization with other olefins. The olefins to be copolymerized include ethylene, 1-butene, 1-pentene, 4-methyl-1-pentene and vinylcyclohexane. These olefins maybe used singly or in combination of two or more of them. Among these olefins, ethylene and 1-butene are preferably used.

The polymerization (hereinafter referred as "main polymerization") of a propylene in the presence of the catalyst made of the foregoing solid catalyst component (A), organic aluminum compound (B) and organic silicon compound (C) is preferably preceded by prepolymerization to further enhance the catalytic activity and the stereoregularity, particle properties of the polymer thus produced and the like. As the monomers to be used in the prepolymerization there may be used the same olefins used in the main polymerization as well as monomers such as styrene.

In the prepolymerization, an order of contact for each component and monomer is arbitrary. Preferably, the organic aluminum compound (B) is charged into the prepolymerization system set up to an atmosphere of an inert gas or a gas to be polymerized such as propylene, next contacted with the solid catalyst component (A), then brought into contact with a propylene and/or one or more olefins. In the case of conducting prepolymerization in combination with the organic silicon compound (C), preferably, the organic aluminum compound (B) is charged into the prepolymerization system set up to an atmosphere of an inert gas or a propylene gas to be polymerized, next contacting with the organic silicon compound (C) and further the solid catalyst component (A), brought into contact with a propylene and/or one or more olefins.

When the polymerization of a propylene is carried out in the presence of the catalyst for polymerization of a propylene formed in the present invention under a condition that a same amount of hydrogen as the polymerization of a propylene with conventional catalyst is used, a melt flow rate (MI) of a polymer produced is 500% at its maximum of that of a polymer produced by a conventional catalyst, and further a catalyst activity and a stereoregularity are shown equally or more than those shown by a conventional catalyst in a performance. Namely, it was confirmed the effects that a catalyst activity and a stereoregularity of a polymer kept high and a hydrogen response improved rapidly by using a catalyst for polymerization of a propylene of the present invention.

Examples of the present invention will be described concretely in the following description as compared with comparative examples.

<Evaluation of a Polymerization>

The evaluation of a bulk polymerization of a propylene is conducted with a catalyst for polymerization of a propylene of the present invention, and a total amount of a polymer produced by per one g of the solid catalyst component (i.e. a polymerization activity called as 'Yield') and a ratio of an amount of a polymer undissolved when the polymer produced was extracted by using a high-temperature type Soxhlet's extractor with boiling n-heptane for 6 hours (HI) were measured. The following equations (4) and (5) determined the Yield and HI. Further, a melt flow rate of the polymer produced (MI), a bulk density (BD) were measured. The methods for measurements of the MI and BD were conducted in accordance with JIS K 7210 and JIS K 6721 respectively.

$$\text{Yield (g-PP/g-cat.)}=a(g)/\text{solid catalyst component (g)} \quad (4)$$

$$\text{HI (wt. \%)}=\{b(g)/a(g)\}\times 100 \quad (5)$$

In the equations (4) and (5) above, a shows a weight of a polymer produced until polymerization reaction was terminated, and b shows a weight of n-heptane undissolved polymer when the polymer produced by the termination of polymerization was extracted with boiling n-heptane for 6 hours.

EXAMPLE 1

<Preparation of a Solid Catalyst Component>

Into a 2000-ml round flask equipped with an agitator in which had been thoroughly replaced by nitrogen gas were charged 150 g of diethoxymagnesium and 750 ml of toluene to make a suspension. The suspension was then added to a solution of 450 ml of toluene and 300 ml of titanium tetrachloride pre-charged into a 2000-ml round flask equipped with an agitator in which had been thoroughly replaced by nitrogen gas. The resulting suspension is reacted at 5° C. for 1 hour (low temperature aging treatment). To the suspension then 22.5 ml of di-n-butyl maleate was added, a temperature of the reaction system was raised to 90° C. where the suspension was subjected to a reaction treatment with stirring for 2 hours (first treatment). After the termination of the reaction, the resulting solid reaction product were then washed with 1300 ml of toluene at a temperature of 80° C. four times (interim washing). Thereafter, to the resulting solid reaction product were added 1200 ml of toluene and 300 ml of titanium tetrachloride. The mixture was then processed with stirring at a temperature of 112° C. for 2 hours (second treatment). After the second treatment, an interim washing and a second treatment was repeated once again. Thereafter, the resulting solid reaction product was washed with 1300 ml of n-heptane seven times and separated by filtration and dried to obtain a powdered solid catalyst component (A). The solid catalyst component was then measured for Ti content. The result was 3.74% by weight.

<Preparation of a Catalyst for Polymerization of a Propylene and Polymerization>

Into a 2200 ml autoclave equipped with an agitator in which the air within had been completely replaced by nitrogen gas were charged the foregoing solid catalyst component in an amount of 0.0026 mmol as calculated in terms of titanium atom, 1.3 mmol of triethylaluminum and 0.13 mmol of cyclohexylmethyldimethoxysilane, and the resulting solution was subjected to stirring treatment to form a polymerization catalyst. Into the autoclave were then charged 2000 ml of hydrogen gas and 1400 ml of liquid propylene. The mixture was then allowed to undergo pre-polymerization at a temperature of 20° C. for 5 minutes and then main polymerization at a temperature of 70° C. for 1 hour. The results of the evaluation of polymerization are set in Table 1.

EXAMPLE 2

<Preparation of a Solid Catalyst Component>

Into a 500-ml round flask equipped with an agitator in which had been thoroughly replaced by nitrogen gas were charged 10 g of the diethoxymagnesium and 80 ml of toluene to make a suspension. To the suspension 20 ml of titanium tetrachloride was added at a temperature of 8° C. To the suspension 1.5 ml of di-n-butyl maleate was added, a temperature of the reaction system was raised to 112° C. where the suspension was then reacted with stirring for 1.5 h. After the termination of the reaction, the resulting product was washed with toluene at a temperature of 90° C. three times, 80 ml of toluene and 20 ml of titanium tetrachloride were newly added, then the mixture was reacted with stirring at a temperature of 100° C. for 2.0 h. Thereafter, the resulting solid reaction product was washed with n-heptane at a temperature of 40° C. seven times and separated by filtration and dried to obtain a powdered solid catalyst component (A). The solid catalyst component was then measured for Ti content. The result was 4.18% by weight.

<Preparation of a Polymerization Catalyst and Polymerization>

The procedure of Example 1 was followed to effect the preparation of a polymerizing catalyst, polymerization, and the evaluation except that the solid catalyst component prepared by the method as is shown in the above description was used. The results of the evaluation of polymerization are set forth in Table 1.

EXAMPLE 3

The procedure of Example 2 was followed to effect the preparation of a solid catalyst component, the preparation of a polymerizing catalyst and the evaluation of polymerization except that 1.0 ml of di-n-butyl maleate was used instead of 1.5 ml of di-n-butyl maleate. Ti content of the resulting solid catalyst component was 7.02% by weight. The results of the evaluation of polymerization are set forth in Table 1.

EXAMPLE 4

The procedure of Example 2 was followed to effect the preparation a solid catalyst component and polymerizing catalyst and the evaluation of polymerization except that 1.5 ml of di-n-butyl maleate and 0.5 ml of diethyl maleate were used instead of 1.5 ml of di-n-butyl maleate. Ti content of the resulting solid catalyst component was 3.73% by weight. The results of the evaluation of polymerization are set forth in Table 1.

EXAMPLE 5

<Preparation of a Solid Catalyst Component>

Into a 2000-ml round flask equipped with an agitator in which had been thoroughly replaced by nitrogen gas were charged 150 g of diethoxymagnesium, 750 ml of toluene, and 22.5 ml of di-n-butyl maleate was added, to make a suspension. The suspension was then added to a solution of 450 ml of toluene and 300 ml of titanium tetrachloride pre-charged into a 2000-ml round flask equipped with an agitator in which had been thoroughly replaced by nitrogen gas. The suspension was reacted at 5° C. for 1 hour (low temperature aging treatment). The temperature of the reaction system was raised to 90° C. where the suspension was then subjected to reaction treatment with stirring for 2 hours (first treatment). After the termination of the reaction, the resulting solid reaction product was then washed with 1300 ml of toluene at a temperature of 80° C. four times (interim washing). Thereafter, to the resulting solid reaction product were added 1200 ml of toluene and 300 ml of titanium tetrachloride. The mixture was then subjected to reaction treatment with stirring at a temperature of 100° C. for 2 hours (second treatment). After the second treatment, an interim washing and a second treatment was repeated once again. Thereafter, the resulting solid reaction product was washed with 1300 ml of n-heptane at a temperature of 40° C. seven times and separated by filtration and dried to obtain a powdered solid catalyst component (A). The solid catalyst component was then measured for Ti content. The result was 3.66% by weight.

<Preparation of a Polymerization Catalyst and Polymerization>

The procedure of Example 1 was followed to effect the preparation of a polymerizing catalyst and the polymerization except that the solid catalyst component prepared by the method as is shown in the foregoing description was used. The results of the evaluation of polymerization are set forth in Table 1.

EXAMPLE 6

The procedure of Example 5 was followed to effect the preparation of a solid catalyst component and the preparation of a polymerizing catalyst and the evaluation of polymerization except that 1.5 h was used instead of 2.0 h for first treatment time, 1.0 h was used instead of 2.0 h for the second treatment time, and 1.0 h was used instead of 2.0 for the second treatment repeated once again. Ti content of the resulting solid catalyst component was 3.05% by weight. The results of the evaluation of polymerization are set forth in Table 1.

Comparative Example 1

The procedure of Example 2 was followed to effect the preparation of a solid catalyst component except that 1.5 ml of di-n-butyl phthalate was used instead of 1.5 ml of di-n-butyl maleate. The solid catalyst component was then measured for Ti content. The result was 2.69% by weight. The procedure of Example 2 was followed to effect the preparation of a polymerizing catalyst and the evaluation of polymerization except that the solid catalyst component prepared by the foregoing method was used. The results of the evaluation of polymerization are set forth in Table 1. A decline of an hydrogen response is cleared from MI which became lower by using the foregoing solid catalyst component.

Comparative Example 2

<Preparation of a Solid Catalyst Component>

Into a 500-ml round flask equipped with an agitator in which had been thoroughly replaced by nitrogen gas were charged 10 g of the diethoxymagnesium and 80 ml of toluene to make a suspension. To the suspension 20 ml of titanium tetrachloride was added. Then a temperature of the suspension is raised to 90° C., and 1.5 ml of dichloride of phthalate was added, the temperature of the reaction system was raised to 115° C. where the suspension was then subjected to reaction treatment with stirring for 2 hours. After the termination of the reaction, the resulting product was washed with 200 ml of toluene at a temperature of 90° C. three times. Thereafter, to the resulting solid reaction product were newly added 80 ml of toluene and 20 ml of titanium tetrachloride. The mixture was subjected to reaction treatment at a temperature of 115° C. with stirring for 2.0 h. Thereafter, the resulting solid reaction product was washed with 200 ml of n-heptane at a temperature of 40° C. seven times and separated by filtration and dried to obtain a powdered solid component (A). The solid catalyst component was then measured for Ti content. The result was 2.87% by weight.

<Preparation of a Polymerization Catalyst and Polymerization>

The procedure of Example 1 was followed to effect the preparation of polymerization catalyst and polymerization except that the solid catalyst component prepared by the method as is shown in the foregoing description was used. The results of the evaluation of polymerization are set forth in Table 1, and a decline of an hydrogen response is cleared from MI which became lower as well as COMPARATIVE EXAMPLE 1.

TABLE 1

| Number of Examples | Yield g-PP/g-cat. | HI wt. % | BD g/ml | MI g/10 min |
|---|---|---|---|---|
| Example 1 | 74,400 | 97.3 | 0.40 | 13 |
| Example 2 | 58,500 | 97.4 | 0.40 | 18 |
| Example 3 | 58,000 | 97.0 | 0.41 | 20 |
| Example 4 | 69,900 | 98.0 | 0.40 | 11 |
| Example 5 | 76,800 | 97.5 | 0.43 | 12 |
| Example 6 | 59,600 | 98.0 | 0.43 | 16 |
| Comparative Example 1 | 58,900 | 97.7 | 0.40 | 5.9 |
| Comparative Example 2 | 44,800 | 97.3 | 0.41 | 3.8 |

From the results as mentioned above, it is cleared that the solid catalyst component having a better balance between an activity, a hydrogen response, a stereoregularity, and a bulk density can be obtained by using the diester of maleic acid each having a straight-chain alkyl group having a carbon number of 2 to 8.

INDUSTRIAL APPLICABILITY

The solid catalyst component and the catalyst of the present invention shows a high activity and an extremely good hydrogen response, and further, a polymer having a high melt flow rate, a high stereoregularity and a high bulk density can be provided in a high yield by using the polymerizing catalyst of the present invention. As the result, it can be possible to solve the problems such as a cost increase accompanied by an increase of amount of hydrogen used, an improvement of equipments, etc. and a decline of a productivity.

What is claimed is:

1. A solid catalyst component, which can be used for polymerization of a propylene, the solid catalyst component being prepared by suspending a dialkoxymagnesium (a) in an aromatic hydrocarbon (d) to make a suspension, where the dialkoxymagnesium (a) contains two alkoxy groups each independently having from 1 to 6 carbon atoms, and then contacting a tetravalent halogen-containing titanium compound (b) with the suspension, and then carrying out a reaction process, wherein before or after the tetravalent halogen-containing titanium compound (b) is contacted with the suspension, one or more species of diesters of maleic acid each having a straight-chain or branched chain alkyl group having a carbon number of 2 to 8 (c) is contacted with the suspension.

2. The solid catalyst component according to claim 1, wherein at least one species of the diesters of maleic acid (c) is a diester of maleic acid having a straight-chain alkyl group having a carbon number of 2 to 5, and a content of the diester of maleic acid having a straight-chain alkyl group having a carbon number of 2 to 5 is at least 50 wt. % of a total amount of the diesters of maleic acid (c).

3. The solid catalyst component according to claim 1, wherein at least one species of the diesters of maleic acid (c) is a combination of at least one species selected from a diester of maleic acid each having a straight-chain alkyl group having a carbon number 2 to 5 and a diester of maleic acid each having a straight-chain or branched chain alkyl group having 2 to 8 carbon atoms, and a content of the at least one species of a diester of maleic acid each having a straight-chain alkyl group having a carbon number of 2 to 5 is at least 50 wt. % of a total amount of the diesters of maleic acid (c).

4. The solid catalyst component according to claim 1 wherein at least one species of the diesters of maleic acid (c) is a di-n-butyl maleate, and a content of the di-n-butyl maleate is at least 50 wt. % of a total amount of the diesters of maleic acid (c).

5. The solid catalyst component according to claim 1, wherein at least one species of the diesters of maleic acid (c) is a combination of at least one species selected from a di-n-butyl maleate and a diester of maleic acid each having a straight-chain or branched chain alkyl group having a carbon number of 2 to 8, and a content of the di-n-butyl maleate is at least 50 wt. % of a total amount of the diesters of maleic acid (c).

6. A solid catalyst, which can be used for polymerization of a propylene, the solid catalyst comprising (A) the solid catalyst component as defined in claim 1;

(B) an organic aluminum compound represented by the general formula (1):

$$R^1{}_q AlQ_{3-p} \tag{1}$$

where $R^1$ represents an alkyl group having a carbon number of 1 to 4;

Q represents a hydrogen atom or halogen atom; and p represents a real number of more than 0 to not more than 3; and (C) an organic silicon compound represented by the general formula (2):

$$R^2{}_q Si(OR^3)_{4-q} \tag{2}$$

where

R² may be the same or different and represents an alkyl group having a carbon number of 1 to 12, cycloalkyl, phenyl, vinyl, allyl or aralkyl group;

R³ may be the same or different and represents an alkyl group having a carbon number of 1 to 4, cycloalkyl, phenyl, vinyl, allyl or aralkyl group; and q represents 0 or an integer of from 1 to 3.

7. The solid catalyst component according to claim 1, wherein the dialkoxymagnesium (a) has an average particle diameter in a range of from 1 to 200 μm.

8. The solid catalyst component according to claim 1 wherein the dialkoxymagnesium (a) has a particle size distribution such that ln ($D_{90}/D_{10}$) is not more than 3, where $D_{90}$ represents a particle diameter in the particle size distribution when an accumulated particle size reaches 90% and $D_{10}$ represents a particle diameter in the particle size distribution when the accumulated particle size reaches 10%.

9. The solid catalyst component according to claim 1 wherein the dialkoxymagnesium (a) contains two alkoxy groups each independently having from 1 to 4 carbon atoms.

10. The solid catalyst component according to claim 1 wherein the dialkoxymagnesium (a) is selected from the group consisting of dimethoxymagnesium, diethoxymagnesium, dipropoxymagnesium, dibutoxymagnesium, ethoxymethoxymagnesium, ethoxypropoxymagnesium and butoxyethoxymagnesium.

11. A method of making a solid catalyst component, the method comprising suspending a dialkoxymagnesium (a) in an aromatic hydrocarbon (d) to make a suspension, where the dialkoxymagnesium (a) contains two alkoxy groups each independently having from 1 to 6 carbon atoms, and then contacting a tetravalent halogen-containing titanium compound (b) with the suspension, and then carrying out a reaction process, and producing the solid catalyst component of claim 1, where before or after the tetravalent halogen-containing titanium compound (b) is contacted with the suspension, one or more species of diesters of maleic acid each having a straight-chain or branched chain alkyl group having a carbon number of 2 to 8 (c) is contacted with the suspension.

12. The method according to claim 11, wherein the dialkoxymagnesium (a) is selected from the group consisting of dimethoxymagnesium, diethoxymagnesium, dipropoxymagnesium, dibutoxymagnesium, ethoxymethoxymagnesium, ethoxypropoxymagnesium and butoxyethoxymagnesium.

13. A method of producing a catalyst, the method comprising mixing (A) a solid catalyst component prepared by suspending a dialkoxymagnesium (a) in an aromatic hydrocarbon (d) to make a suspension, where the dialkoxymagnesium (a) contains two alkoxy groups each independently having from 1 to 6 carbon atoms, and then contacting a tetravalent halogen-containing titanium compound (b) with the suspension, and then carrying out a reaction process, wherein before or after the tetravalent halogen-containing titanium compound (b) is contacted with the suspension, one or more species of diesters of maleic acid each having a straight-chain or branched chain alkyl group having a carbon number of 2 to 8 (c) is contacted with the suspension;

(B) an organic aluminum compound represented by the general formula (1):

$$R^1_p AlQ_{3-p} \qquad (1)$$

where

R¹ represents an alkyl group having a carbon number of 1 to 4;

Q represents a hydrogen atom or halogen atom; and p represents a real number of more than 0 to not more than 3; and (C) an organic silicon compound represented by the general formula (2):

$$R^2_q Si(OR^3)_{4-q} \qquad (2)$$

where

R² may be the same or different and represents an alkyl group having a carbon number of 1 to 12, cycloalkyl, phenyl, vinyl, allyl or aralkyl group;

R³ may be the same or different and represents an alkyl group having a carbon number of 1 to 4, cycloalkyl, phenyl, vinyl, allyl or aralkyl group; and q represents 0 or an integer of from 1 to 3; and producing the solid catalyst of claim 6.

14. The method according to claim 13, wherein the dialkoxymagnesium (a) is selected from the group consisting of dimethoxymagnesium, diethoxymagnesium, dipropoxymagnesium, dibutoxymagnesium, ethoxymethoxymagnesium, ethoxypropoxymagnesium and butoxyethoxymagnesium.

* * * * *